US009329927B2

(12) United States Patent
Ito (10) Patent No.: US 9,329,927 B2
(45) Date of Patent: May 3, 2016

(54) SEMICONDUCTOR DEVICE (71) Applicant: Renesas Electronics Corporation, Kawasaki-shi, Kanagawa (JP)

(72) Inventor: Masayuki Ito, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 376 days.

(21) Appl. No.: 14/054,168

(22) Filed: Oct. 15, 2013

(65) Prior Publication Data

US 2014/0115401 A1   Apr. 24, 2014

(30) Foreign Application Priority Data

Oct. 18, 2012 (JP) ................ 2012-230383

(51) Int. Cl.
*G06F 11/10* (2006.01)
*G06F 11/16* (2006.01)

(52) U.S. Cl.
CPC ............ *G06F 11/10* (2013.01); *G06F 11/1641* (2013.01); *G06F 11/1695* (2013.01); *G06F 2201/83* (2013.01)

(58) Field of Classification Search
CPC ... H04N 19/147; H04N 5/783; H04N 9/8042; G06F 1/04; G06F 15/16; G06F 17/5031; G11B 20/00007
See application file for complete search history.

(56) References Cited

U.S. PATENT DOCUMENTS

| | | | |
|---|---|---|---|
| 5,799,022 A | 8/1998 | Williams | |
| 5,933,624 A * | 8/1999 | Balmer | G06F 9/30032 712/205 |
| 8,065,564 B2 | 11/2011 | Nakatani et al. | |
| 8,237,737 B2 * | 8/2012 | Lu | G09G 5/005 345/604 |
| 8,433,955 B2 * | 4/2013 | Yamada | G06F 11/004 714/48 |
| 2001/0047359 A1 * | 11/2001 | Videcrantz | H03M 7/3086 |
| 2003/0035502 A1 * | 2/2003 | Boerker | G06F 13/385 375/372 |
| 2003/0098805 A1 * | 5/2003 | Bizjak | H03G 3/32 341/139 |
| 2004/0133926 A1 * | 7/2004 | Numata | G11B 27/031 725/135 |
| 2005/0021275 A1 * | 1/2005 | Lawrence | G11C 29/56 702/122 |

(Continued)

FOREIGN PATENT DOCUMENTS

| | | |
|---|---|---|
| JP | 10-116528 A | 5/1969 |
| JP | 1-2651711 | 10/1989 |

(Continued)

*Primary Examiner* — Loan L. T. Truong
(74) *Attorney, Agent, or Firm* — Foley & Lardner LLP (57) ABSTRACT

A semiconductor device comprising: a first processor; a second processor; a first delay circuit delaying a signal input into the first processor by a predefined number of cycles and inputting the signal into the second processor; a first compression circuit compressing a signal of n-bit width from the first processor into a signal of m-bit width (m<n) and outputting the signal of m-bit width; a second compression circuit compressing a signal of n-bit width from the second processor into a signal of m-bit width and outputting the signal of m-bit width; a second delay circuit delaying the signal from the first compressor by the predefined number of cycles and outputting the delayed signal; and a coincidence comparison circuit comparing bit-wise the corresponding bits of the signals from the second delay circuit and from the second compression circuit to check whether the corresponding bits coincide with each other or not.

15 Claims, 8 Drawing Sheets

(56) References Cited

U.S. PATENT DOCUMENTS

| | | | |
|---|---|---|---|
| 2005/0039074 A1* | 2/2005 | Tremblay | G06F 11/1691 714/11 |
| 2006/0026980 A1* | 2/2006 | Drysdale | F01D 1/023 62/228.1 |
| 2008/0244305 A1 | 10/2008 | Troppmann et al. | |
| 2009/0172370 A1* | 7/2009 | Butler | G06F 9/3804 712/234 |
| 2009/0183035 A1* | 7/2009 | Butler | G06F 11/1645 714/48 |
| 2010/0052724 A1* | 3/2010 | Mizuno | G01R 31/31703 324/750.3 |
| 2010/0100923 A1* | 4/2010 | Toiyama | H04N 21/2365 725/131 |
| 2010/0131741 A1* | 5/2010 | Yamada | G06F 11/004 712/215 |
| 2010/0294944 A1* | 11/2010 | Furumiya | G01T 1/1647 250/370.1 |
| 2011/0123170 A1* | 5/2011 | Kure | H04N 21/234318 386/241 |
| 2011/0153883 A1 | 6/2011 | Kato | |
| 2012/0133394 A1* | 5/2012 | Fukuda | H03K 5/26 327/12 |

FOREIGN PATENT DOCUMENTS

| | | |
|---|---|---|
| JP | 5-324391 A | 12/1993 |
| JP | 2011-123545 A | 6/2011 |
| JP | 2011-128821 A | 6/2011 |

* cited by examiner

SEMICONDUCTOR DEVICE

CROSS-REFERENCE TO RELATED APPLICATIONS

The disclosure of Japanese Patent Application No. 2012-230383 filed on Oct. 18, 2012 including the specification, drawings and abstract is incorporated herein by reference in its entirety.

BACKGROUND

The present invention relates to a semiconductor device and more particularly to a semiconductor device including processors (CPU cores).

It is required to detect quickly and accurately the fault (failure) of a semiconductor device while the semiconductor device is running in order to improve the functional safety and the like of the semiconductor device. Here, the functional safety means safety realized by the correct operation of a safety function. For example, there is ISO26262 laid down by ISO (International Organization for Standardization) as a functional safety standard for in-vehicle electronic devices and the like. As an example of a means to materialize a fail-safe function in which a device is controlled so that the safety of operation of the device is assured even if the failure of the device occurs owing to the malfunction, etc. of the device, or a fault-tolerant function in which a system can continue to run without stopping even if a malfunction occurs in a part, etc., a lockstep system is used. In a dual-core lockstep system, two processors (CPU (central processing unit) cores) of the same configuration perform the same processing, and a fault is detected, if any, by detecting the difference between the processing results obtained by the two processors.

For example, Japanese Unexamined Patent Application Publication No. Hei 10(1998)-116258 that discloses a lockstep fault-tolerant computer system may be referred to. In Japanese Unexamined Patent Application Publication No. Hei 10(1998)-116258, each of subsystems includes: a parallel input signature generation unit used for data compression that enables the operations of internal modules to be actually compared with each other; and a logic analysis unit for memorizing the outputs of the internal modules of the lockstep subsystem. The lockstep fault-tolerant computer system disclosed in this Patent Application Publication is configured so that, after an out-of-synchronization event occurs, the lockstep fault-tolerant computer system automatically searches the traces of the logic analysis unit; locates the position of the first difference in its active condition; determines an internal module that has given out a defective output, and indicates that the internal module is faulty.

As one of related technologies in which the output signals of processors are compressed and compared with each other, a comparative/redundant type information processing device including a first processing unit and a second processing unit that execute the same processes in parallel is disclosed, for example, in Japanese Unexamined Patent Application Publication No. 2011-113545, and the comparative/redundant type information processing device is configured as follows. Each of the first and second processing unit of the comparative/redundant type information processing device includes a diagnosis unit that compares and judges whether data obtained by the executions performed by the two processing units coincide with each other or not. The diagnosis unit includes: a summary information conversion unit that executes hash operation on the calculation data calculated by the processor and compresses the hashed data to make summary information; a summary information memory unit that memorizes the summary information; and a comparison unit that compares the summary data that is memorized by the summary information memory unit with summary information processed by a diagnosis unit to which the comparison unit does not belong, and judges whether both pieces of summary information coincide with each other or not. Each of the first and second processing unit compares both pieces of summary information obtained by compressing the calculation data with each other, judges whether both pieces of summary information coincide with each other or not, and sends a judgment signal to a system selection unit.

Japanese Unexamined Patent Application Publication No. Hei 5(1993)-324391 discloses a fault detection device used in a fail-safe processing apparatus in which the presence or absence of a fault is observed by operating plural microprocessors (CPU1, CPU2) in clock synchronization, and by comparing the bus outputs ($2^0$ to $2^m$) of the plural microprocessors that are running in clock synchronization. This fault detection device includes a bus comparison unit having a compression processing section in which predefined bit number of the multi-bit bus output ($2^0$ to $2^m$) of each of the microprocessors (CPU1, CPU2) is serially code compressed per bit or per unit of multi bits, and a comparison section that serially compares the compressed data of the microprocessors, which are output from the compression processing section, with each other, and detects a fault in the case where there is a discrepancy between the operations of the microprocessors.

Japanese Unexamined Patent Application Publication No. Hei 1(1989)-265171 discloses a configuration including a test pattern generator for generating random patterns as test inputs into plural devices of which a redundant apparatus is comprised; a compressor for temporally compressing the outputs generated by the devices in association with the test inputs to create compression values unique to the respective devices; an adder for adding the outputs of the compressor in modulo 2 arithmetic when the test inputs into the respective devices are finished; and a comparator that compares the addition result of the adder with a predefined random pattern that is determined on the basis of the pattern input number of the random patterns input into the respective devices to judge whether the addition result coincides with the predefined random pattern or not.

Japanese Unexamined Patent Application Publication No. 2011-128821 discloses a configuration including a first code analyzer (LFSR: Linear Feedback Shift Register) for compressing and encoding the history of multi-bit data that appears at an address bus or a data bus of a first microprocessor; a second code analyzer for compressing and encoding the history of multi-bit data that appears at an address bus or a data bus of a second microprocessor in the same procedures as in the case of the code analyzer; and a verification means for comparing a code obtained by the first code analyzer with a code obtained by the second code analyzer, with the result that the processing load of the microprocessors can be lightened, and at the same time failures can be accurately and speedily detected.

Figure 1:
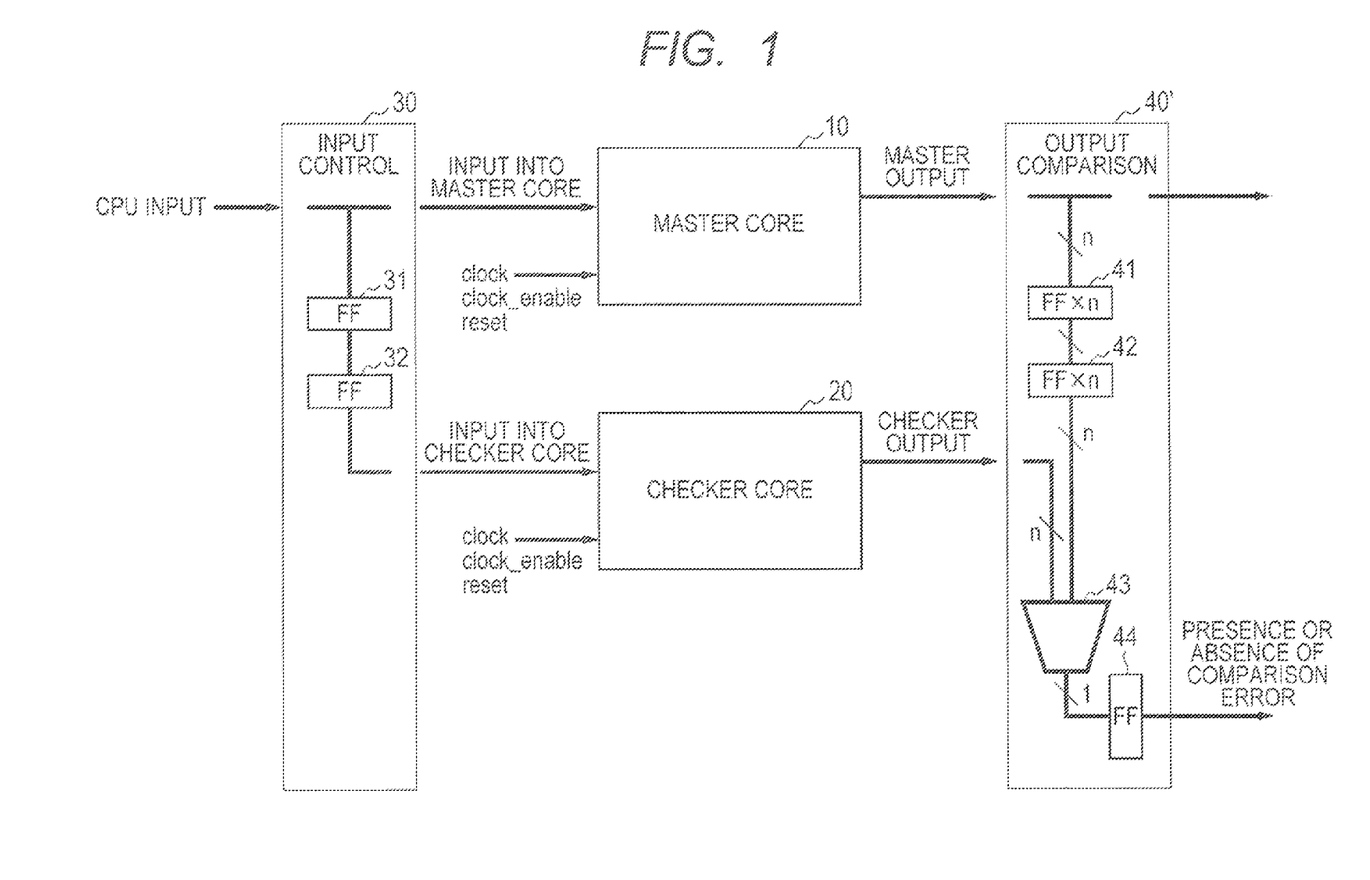
FIG. 1 a diagram showing a prototype of a semiconductor device.

FIG. 1 is a diagram showing a prototype example of a semiconductor device of clock-delay type dual-core lockstep scheme. With reference to FIG. 1, this semiconductor device includes a first processor (CPU core) 10 for a normal operation; a second processor (CPU core) 20 for monitoring the operation of the first processor for the normal operation; an input control circuit 30; and an output comparison circuit 40'. The first and second processors 10 and 20, of which the dual-core lockstep system is comprised, have the same configuration, and they are also referred to as a "Master core", and a "Checker core" respectively. Each of the processors (10 and 20) includes, for example, a CPU, a cache memory, a cache controller, an interrupt controller (INTC), an interrupt interface, a bus interface, and the like, although all these items are not always musts. In addition, it is also all right that each of the processors further includes a floating processing unit (FPU) that carries out floating point operations, a memory protection unit (MPU) that executes access control on external memories; a peripheral interface that is used for accessing external peripherals (address spaces).

A CPU input into the input control circuit 30 represents a signal input into the first processor (Master core) 10. The CPU input corresponds to a signal input into the first processor 10 as a response sent from a memory, I/O devices, or the like (not shown in FIG. 1) in response to an access performed by the first processor 10 to the memory, I/O devices, or the like. Flip-flops (FFs) 31 and 32 function as delay circuits that delay the CPU input by the time period of a predefined number of cycles. Each of the flip-flops (FFs) 31 and 32 is, for example, an edge-trigger type D-flip-flop (D-FF) that outputs a sampled signal, which is obtained by sampling a signal input into the data terminal, at the rising edge of a clock signal. The flip-flops (FFs) 31 and 32, which are cascade-coupled in series, function as a shift register, and the CPU input is output from the flip-flop (FF) 32, for example, with a delay time of two clock cycles while the clock signal is used as a shift clock. Alternatively, in the case where the flip-flops (FFs) 31, 32 are configured in such a way that the flip-flop 31 samples a signal input into the data terminal of the flip-flop 31 at the rising edge of the clock signal, and the flip-flop 32 samples a signal input into the data terminal of the flip-flop 32 at the falling edge of the clock signal, the flip-flops (FFs) 31 and 32 function as a delay circuit with a delay time of one and a half clock cycles.

A signal that is input into the first processor 10, that is, the CPU input, is delayed by the flip-flops 31 and 32, and this delayed signal is input into the second processor 20. The second processor 20 brings in the same signal that the first processor brings in, for example, the time period of two clock cycles later, and performs the same processing as the first processor does the time period of two clock cycles later. Because of the delay (dispersion) between the timings of pieces of processing performed by the first and second processors 10 and 20, the peak of electricity consumption and the like can be dispersed.

In addition, in FIG. 1, it is needless to say that the input signal (CPU Input) into the first processor 10 or the second processor 20 can be a multi-bit (parallel-bit) signal. In this case, in the input control circuit 30, plural two-stage flip-flops (31, 32) should be installed in parallel in accordance with the number of bits of the input multi-bit signal. It is necessary that the same consideration as above should be paid to the drawings described hereinafter.

In an output comparison circuit 40', a two-stage flip-flop (41, 42) functions as a delay circuit that delays an n-bit signal (Master output) that is output from the first processor by the delay time same as the two-stage flip-flop (31, 32) of the input control circuit 30 gives to the CPU input. Each of the flip-flop (FF×n) 41 and the flip-flop (FF×n) 42 includes plural edge-trigger type D-flip-flops (D-FFs) each of which outputs a sampled-data signal obtained by sampling a signal input into its data terminal at the rising edge of a clock signal (not shown in FIG. 1), and n D-flip-flops (n represents the number of the D-flip-flops) are disposed in parallel in accordance with the n-bit output. In FIG. 1, "FF×n" denotes that n 1-bit flip-flops (FFs) (n represents the number of the 1-bit flip-flops) are disposed in parallel.

The two-stage flip-flop (41, 42) delays the n-bit signal (Master output) output from the first processor 10, for example, by the time period of two clock cycles.

A coincidence comparison circuit 43 examines whether the n-bit signal output in parallel from n flip-flops of which the flip-flop 42 is comprised and the n-bit signal (Checker output) output from the second processor 20 the time period of two clock cycles later in comparison with the output from the first processor 10 coincide with each other or not. In this case, the coincidence comparison circuit 43 compares bit-wise the corresponding bits of the two n-bit signals with each other to check whether the corresponding bits of the two n-bit signals coincide with each other.

A flip-flop 44 samples a comparison result output (1-bit) from the coincidence comparison circuit 43 per clock, and outputs the sampled comparison result output as a presence or absence of comparison error signal. If there is a comparison error, it means that an error such as a data breakdown has occurred in the processors. In this case, the first processor 10, the second processor 20, and the like perform predetermined pieces of processing in accordance with a functional safety target and the like. In FIG. 1, a clock signal "clock", a clock enable signal "clock_enable" that is a control signal for controlling the activation of the clock signal, and a reset signal "reset" are input into both first and second processors 10 and 20 in common. In addition, the clock signal clock and the reset signal reset are input not only into the first and second processors 10 and 20 in common, but also into the input control circuit 30 and the output comparison circuit 40' in common as well.

SUMMARY

Analysis of the prototype example of the semiconductor shown in FIG. 1, will be given hereinafter.

In order to compare the output signal (n-bit) from the first processor 10 with the output signal (n-bit) from the second processor 20, the delay circuit (the two-stage flip-flop (41, 42)) for delaying the output signal of the first processor 10, for example, by the time period of two clock cycles is needed. If such a circuit of a two-clock delay scheme as above is used, in order to compare the output signal (for example, 2000-bit parallel output) of the first processor 10 with the output signal (for example, 2000-bit parallel output) of the second processor 20, the two-stage flip-flop (41, 42) (each stage of the two-stage flip-flop is denoted by FF×n) needs four thousand (2000×2) 1-bit flip-flops. As a result, the circuit area increases and the power consumption also increases. Other problems of the related arts and new features of the present invention will be revealed in accordance with the description of the present invention and the accompanying drawings hereinafter.

According to an aspect of the present invention, a semiconductor device includes: a first processor; a second processor; a first delay circuit that delays a signal that is input into the first processor by a predefined number of cycles, and inputs the delayed signal into the second processor; a first compression circuit that brings in an output signal of n-bit width output in parallel from the first processor and compresses the signal of n-bit width into a signal of m-bit width (wherein m<n); a second compression circuit that brings in an output signal of n-bit width output in parallel from the second processor and compresses the signal of n-bit width into a signal of m-bit width; a second delay circuit that brings in the signal of m-bit width output from the first compressor, delays the signal of m-bit width by the time period of the predefined number of cycles, and outputs the delayed signal in parallel; and a coincidence comparison circuit that compares bit-wise the corresponding bits of the signal of m-bit width output in parallel from the second delay circuit and the signal of m-bit width output in parallel from the second compression circuit with each other to check whether the corresponding bits of the two signals coincide with each other or not.

The semiconductor device according to the above aspect of the present invention is configured in such a way that a signal of n-bit width output from a processor is compressed into a signal of m-bit width, the signal of m-bit width is input into the corresponding delay circuit, and therefore the number of flip-flops of one stage of a two-stage flip-flop forming a delay circuit is reduced to n to m (m<n). As a result, the increases in the circuit area and power consumption of the semiconductor device of clock delay type lockstep scheme can be suppressed or reduced.

DETAILED DESCRIPTION

Figure 2:
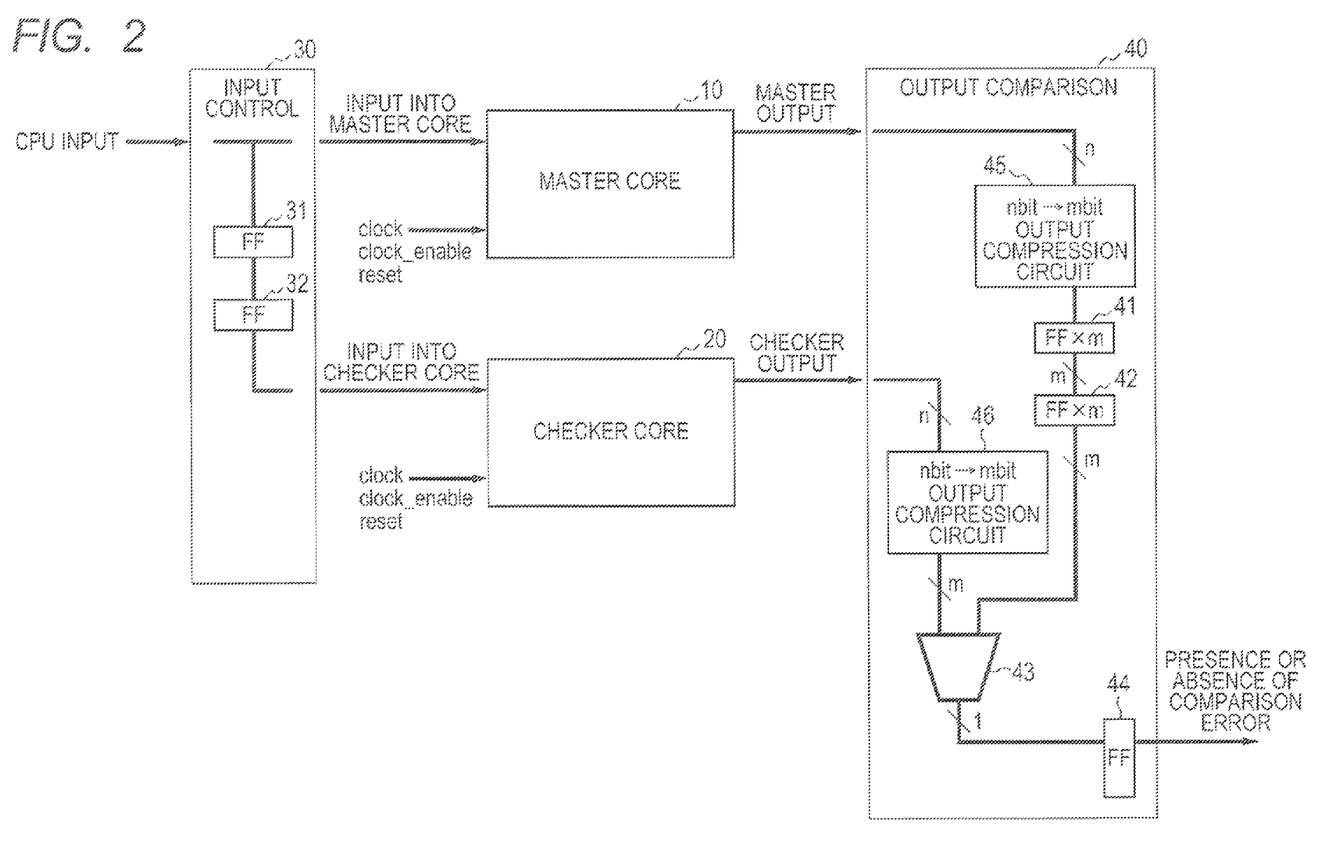
FIG. 2 is a diagram showing the configuration of a first embodiment of the present invention.

With reference to FIG. 2, a semiconductor device according to one embodiment of the present invention includes: a first processor (10); a second processor (20); and a first delay circuit (31, 32) that brings in a signal that is input into the first processor, delays the brought-in signal by the time period of a predefined number of cycles, and inputs the delayed signal into the second processor. The semiconductor device further includes a first compression circuit (45) that brings in a signal of n-bit width output from the first processor (10) and compresses the signal of n-bit width into a signal of m-bit width (wherein m<n). The semiconductor device further includes: a second compression circuit (46) that brings in a signal of n-bit width output from the second processor (20) and compresses the signal of n-bit width into a signal of m-bit width; a second delay circuit (41, 42) that brings in the signal of m-bit width output from the first compressor (45), delays the signal of m-bit width by the time period of the predefined number of cycles used by the first delay circuit, and outputs the delayed signal; and a coincidence comparison circuit (43) that brings in the signal of m-bit width output from the second delay circuit and the signal of m-bit width output from the second compression circuit, and compares bit-wise the corresponding bits of the two brought-in signals with each other to check whether the corresponding bits of the two brought-in signals coincide with each other or not. In addition, each of the first and second compression circuits (45, 46) includes a hash function (compression function) circuit (47) as a circuit that compresses the signal of n-bit width into the signal of m-bit width.

In a semiconductor device according to one embodiment, each of the first and second compression circuit (45, 46) breaks down the signal of n-bit width into plural groups, includes at least one hash function circuit ($47_1$ to $47_s$ in FIG. 5, or $47_1$ to $47_m$ in FIG. 4) that compresses a signal of at least one group out of signals or the plural groups into a signal of 1-bit width, and outputs the compressed signal of 1-bit width, and the sum of the number of the bit width of the at least one output signal output from the hash function circuit and, if there are any remaining groups, the numbers of the bit widths of signals of the remaining groups (d in FIG. 5) is m.

It is all right that, in the semiconductor device, each of the first and second compression circuit (24, 25) is configured to break down the signal of n-bit width into m groups (wherein m represents the number of the groups), and to include m hash function (compression function) circuits ($47_1$ to $47_m$ in FIG. 4) (wherein m represents the number of the hash function circuits) that respectively compress the signals of m groups into signals of 1-bit width and output the compressed signals of 1-bit width.

The m hash function (compression function) circuits ($47_1$ to $47_m$ in FIG. 4) include at least two hash function (compression function) circuits whose compression ratios are different from each other.

Each of the first and second compression circuit (45, 46) breaks down the signal of n-bit width into (s+1) groups (wherein (s+1) represents the number of the groups); outputs a signal of d-bit width of one group without changing the d-bit width (d+s=m); and includes s hash (compression function) circuits ($47_1$ to $47_s$ in FIG. 5) (wherein s represents the number of the hash function circuits) that compress the bit widths of signals of s groups into 1-bit widths respectively.

The semiconductor device may further be configured to include: a first sampling circuit (re-timing circuit) (49 in FIG. 6) that samples a signal of predetermined k-bit width out of the signal of m-bit width output from the second compression circuit (46); a second sampling circuit (re-timing circuit) (48 in FIG. 6) that samples a signal of k-bit width, which corresponds to the bit number of the signal the first sampling circuit samples, out of the signal of m-bit width output from the second delay circuit (41, 42), in which a signal of k-bit width sampled by the first sampling circuit (49) and a remaining signal of (m−k)-bit width out of the signal of m-bit width output from the second compression circuit (46), and a signal of k-bit width sampled by the second sampling circuit (48) and a remaining signal of (m−k)-bit width out of the signal of m-bit width output from the second delay circuit (41, 42) are respectively input into the coincidence comparison circuit (43).

In the semiconductor device, each of the first and second sampling circuits (re-timing circuits) (48, 49) may be configured to include k flip-flops (wherein k represents the number of the flip-flops) that are coupled in parallel, bring in and sample the signal of k-bit width in response to the trigger edge of a clock signal, and output the sampled signal. In addition, because a critical path owing to the coincidence comparison circuit (43) and the like is resolved, the lowering of the clock frequency for securing a timing margin and the like can be avoided and the high-speed operation of the semiconductor device can be realized (with the use of a high clock frequency).

In the semiconductor device, the coincidence comparison circuit (43) may be configured to break down the signal of m-bit width output from the second delay circuit (41, 42) into (s+1) groups (wherein (s+1) represents the number of the groups); to break down the signal of m-bit width output from the second compression circuit (46) into (s+1) groups; to include a first to a (s+1)th coincidence comparison circuits, in which the first coincidence comparison circuit compares a signal of the first group output from the second delay circuit and a signal of the first group output from the second compression circuit with each other and outputs a comparison result of a 1-bit width, and the (s+1)th coincidence comparison circuit compares a signal of the (s+1)th group output from the second delay circuit and a signal of the (s+1)th group output from the second compression circuit with each other and outputs a comparison result of a 1-bit width; and to further include a logic circuit (52 in FIG. 7) that brings in respective 1-bit outputs of the first to the (s+1)th coincidence comparison circuits ($50_1$ to $50_{s+1}$ in FIG. 7), and outputs the logic operation result of the brought-in signal of (s+1)-bit width as a comparison result obtained by comparing the signal of m-bit width output from the second delay circuit and the signal of m-bit width output from the second compression circuit.

The semiconductor device may also be configured to include at least one third sampling circuit (re-timing circuit) ($51_1$ to $51_s$ in FIG. 7) that brings in and samples at least one predetermined output out of the outputs of the first to the (s+1)th coincidence comparison circuits ($50_1$ to $50_{s+1}$ in FIG. 7), and inputs the sampled at least one predetermined output into the logic circuit (52). The third sampling circuits (retiming circuits) ($51_1$ to $51_s$ in FIG. 7) may also be configured to include flip-flops that sample inputs in response to the trigger edge of a clock signal and output the sampled inputs.

The semiconductor device may also be configured to include a circuit (60 in FIG. 8) that exercises control over supplying a clock signal to both first and second processors (10, 20) in common or stopping supplying the clock signal to one of the first and second processors.

In the semiconductor device, the first delay circuit includes flip-flops (31 and 32 in FIG. 2) that are arranged in a predetermined number of cascade-coupled stages, each of the stages has parallel-disposed flip-flops the number of which corresponds to the bit number of the input signal, and the parallel-disposed flip-flops sample the input signal in response to the edge trigger of a clock signal and outputs the sampled signal.

In the semiconductor device, the second delay circuit includes flip-flops that are arranged in a predetermined number of cascade-coupled stages, each of the stages has m parallel-disposed flip-flops (41 and 42 in FIG. 2) (wherein m represents the number of the parallel-disposed flip-flops), and the parallel-disposed flip-flops sample the input signal in response to the edge trigger of a clock signal and outputs the sampled signal.

Figure 9:
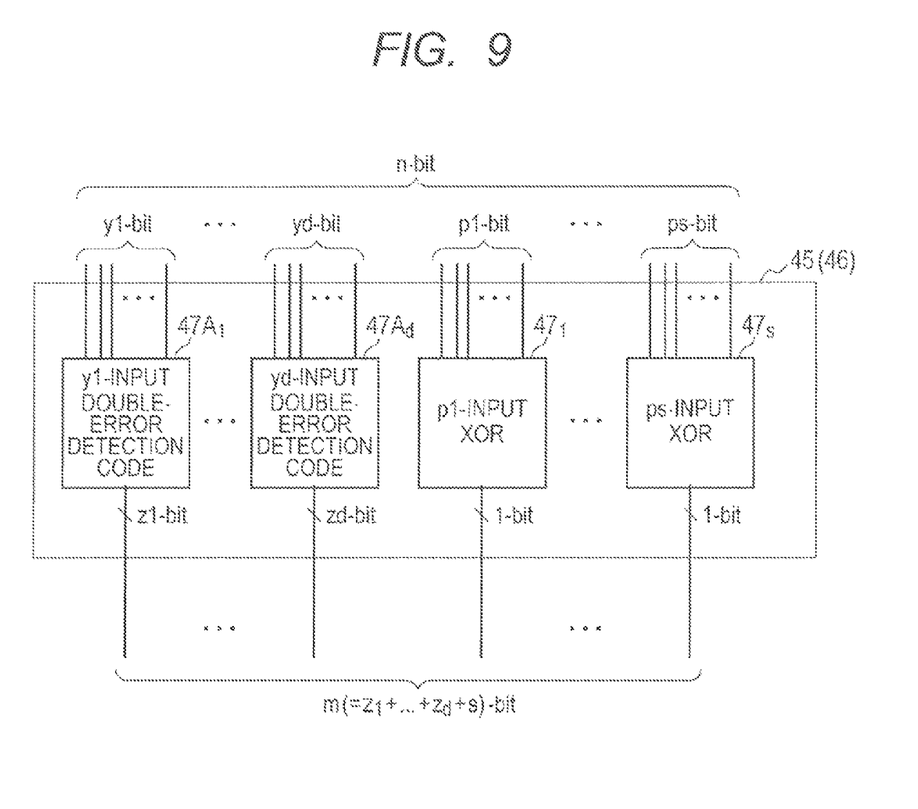
FIG. 9 is a diagram showing an example of the configuration of an n-bit-to-m-bit output compression circuit according to a seventh embodiment.

In the semiconductor device, each of the first and second compression circuit may be configured to break down the signal of n-bit width into plural groups; and to further include, as a hash function circuit corresponding to a signal of at least one group out of the signals of the plurality of groups, a coding circuit that forms a multi-bit error detectable code regarding the input signal of the at least one group, and outputs a signal obtained by compressing the bit width of the input signal of the at least one group. FIG. 9 is a diagram showing a configuration of the first or second compression circuit (45 or 46) in the case where the number of the at least one group is d. Reference numerals $47A_1$ to $47A_d$ denote d coding circuits (where d represents the number of the coding circuits); reference numerals y1 to yd denote the bit widths of the signals of d groups (where d represents the number of the groups); and reference numerals z1 to zd denote the compressed bit width of the signals of the d groups.

The increases in the circuit area and power consumption of the semiconductor device of clock delay type lockstep scheme can be suppressed or reduced by compressing the output signal of n-bit width from the first processor (10) into a signal of m-bit width, by inputting the signal of m-bit width to the delay circuits (41, 42), and by reducing the number of flip-flops of one stage of the two-stage flip-flop forming the delay circuit (41, 42) from n to m (m<n). In addition, by compressing the output signal of n-bit width from the second processor (20) into a signal of m-bit width, and by comparing the signal of m-bit signal with the signal of m-bit width output from the delay circuit (41, 42) to examine whether the former signal coincides with the latter, the circuit area and power consumption of the semiconductor device can be reduced in comparison with the case where signals of n-bit width are compared with each other. The above described embodiments will be described in more detail with reference to the accompanying drawings hereinafter.

First Embodiment

FIG. 2 is a diagram showing the configuration of a first embodiment of the present invention. Here, elements in FIG. 2 that are the same as or equivalent to elements in FIG. 1 are given the same reference numerals as those given to the elements in FIG. 1 respectively. Hereinafter, the descriptions about parts in FIG. 2 that respectively overlap parts in FIG. 1 will be accordingly omitted, if necessary. With reference to FIG. 2, this semiconductor device includes a first processor 10 and a second processor 20 that respectively function as a Master core and a Checker core of dual core lockstep scheme, an input control circuit 30, and an output comparison circuit 40. The input control circuit 30 delays a signal input into the first processor 10 (CPU input) by a predefined clock cycles (for example, two clock cycles) with the use of a two stage flip-flop (31, 32), and inputs the delayed signal into the second processor 20.

In the output comparison circuit 40, after an output signal (Master output) of n-bit width output from the first processor 10 is compressed into a signal of m-bit by an n-bit-to-m-bit output compression circuit 45, the signal of m-bit is input into a two-stage flip-flop (41, 42). Each of the flip-flops (FFs) 41 and 42 is comprised of, for example, edge-trigger type D flip-flops each of which samples a signal input into its data terminal, for example, at the rising edge of a clock signal, and outputs the sampled signal. The number of the edge trigger type D flip-flops disposed in parallel in each stage is m, and this number m corresponds to the bit width m of the signal. Here, "FF×m" in FIG. 2 denotes that m 1-bit flip-flops (FFs) (wherein m represents the number of the 1-bit flip-flops) are disposed in parallel (Similar expressions in the following drawings denote the similar meanings). The two-stage flip-flop (41, 42) delays the output of the n-bit-to-m-bit output compression circuit 45 by a delay time of the same length used by the two-stage flip-flop (31, 32) (a predefined clock cycles, for example, two clock cycles).

In addition, in the output comparison circuit 40, the output signal (Checker output) of n-bit width output from the second processor 20 is compressed into a signal of m-bit width by an n-bit-to-m-bit output compression circuit 46. In a coincidence comparison circuit 43 of m-bit width, the output signal (of m-bit width) output from m flip-flops of which the flip-flop 42 is comprised and the output signal (of m-bit width) from the n-bit-to-m-bit output compression circuit 46 are bit-wise compared with each other, and a comparison result of 1-bit width is output. A flip-flop 44 samples the output signal of the coincidence comparison circuit 43 in synchronization with the clock signal. The same compression logic and the same configuration can be applied to both n-bit-to-m-bit output compression circuits 45 and 46. Here, in FIG. 2, a clock signal "clock", a clock enable signal "clock_enable" that controls the activation of the clock signal, and a reset signal "reset" are input into both first and second processors 10 and 20 in common.

According to the first embodiment, the n-bit-to-m-bit output compression circuit 45 compresses the output signal (Master signal) of n-bit width from the first processor 10 into a signal of m-bit width, and the compressed signal of m-bit width is delayed by the two stage flip-flop (41, 42). The signal of m-bit width that is obtained by compressing the output signal of n-bit width from the second processor 20 (Checker output that is more delayed by, for example, two clock cycles than Master output) with the use of the n-bit-to-m-bit output compression circuit 46 is compared with the signal of m-bit width output from the m flip-flops of which the flip-flop 42 is comprised.

According to the first embodiment, in the output comparison circuit 40, a delay circuit that delays the output signal from the first processor 10 (Master output) is materialized with the use of 2×m flip-flops (wherein 2×m represents the number of the flip-flops), and a coincidence comparison circuit for comparing the above two signals is materialized with the use of a coincidence comparison circuit of m-bit width. On the other hand, in the configuration shown in FIG. 1, in association with the output signals of n-bit width from the first and second processors of dual-core lockstep scheme, 2n flip-flops (wherein 2n represents the number of flip-flops) for delaying the output signal of n-bit width from the first processor are needed, and a coincidence comparison circuit of n-bit width for comparing the output signals of n-bit width from the first and second processors are needed to check whether the two signals of n-bit width coincide with each other.

Therefore, according to the first embodiment, the number of flip-flops, of which the two-stage flip-flop (41, 42) of the output comparison circuit 40 is comprised, is reduced from 2×n (in FIG. 1) to 2×m (in FIG. 2). In addition, according to this embodiment, the bit number of the signal compared by the coincidence comparison circuit 43 is reduced from n to m. Therefore, even if the bit width of the signal output from the processor 10 or 20 increases, the increase in the circuit area and the increase in the power consumption can be suppressed.

Figure 3:
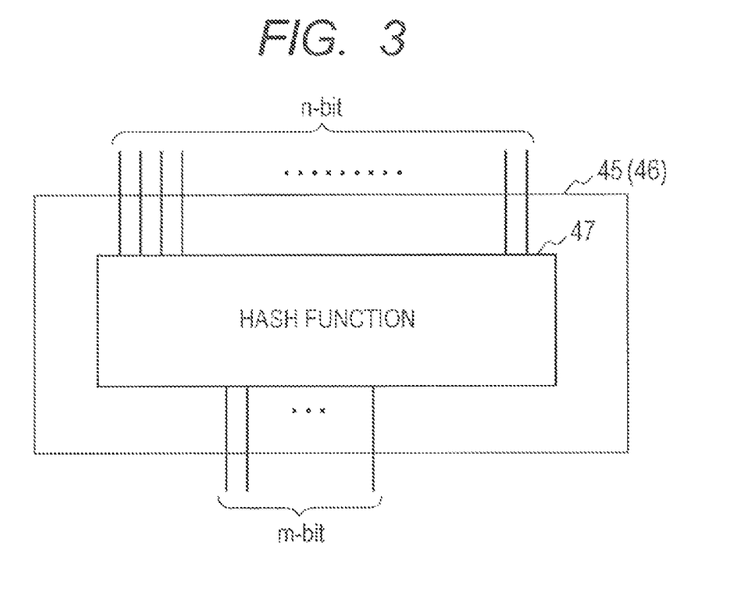
FIG. 3 is a diagram showing an example of the configuration of an n-bit-to-m-bit output compression circuit according to the first embodiment.

FIG. 3 is a diagram showing the configuration of an n-bit-to-m-bit output compression circuit 45 (or 46) shown in FIG. 2. The n-bit-to-m-bit output compression circuit 45 (or 46) uses a hash function (hash function circuit) 47 as a compression function. The hash function 47 allocates a value representing a data (hash value) to the data. In this case, the hash function 47 compresses a signal of n-bit width into a signal of m-bit width (hash value). The hash function 47 maps an input of n-bit width (which can maximally take $2^n$ values) to a hash value of m-bit width (which can maximally take $2^m$ values). There is a case where the hash function allocates the same hash value to different inputs (This case will be referred to as the collision of hash values hereinafter). When an input of 8-bit width (which can maximally take 256 values) is mapped to a value of 4-bit width (which can maximally take 32 values), there is a case where one hash value is allocated to, for example, eight different inputs in common. If a signal of n-bit width falls within $2^m$ fixed values (wherein $2^m$ is the number of the fixed values), it is possible to configure a hash function that can avoid the collision of hash values (this hash function is referred to a complete hash function).

Second Embodiment

Figure 4:
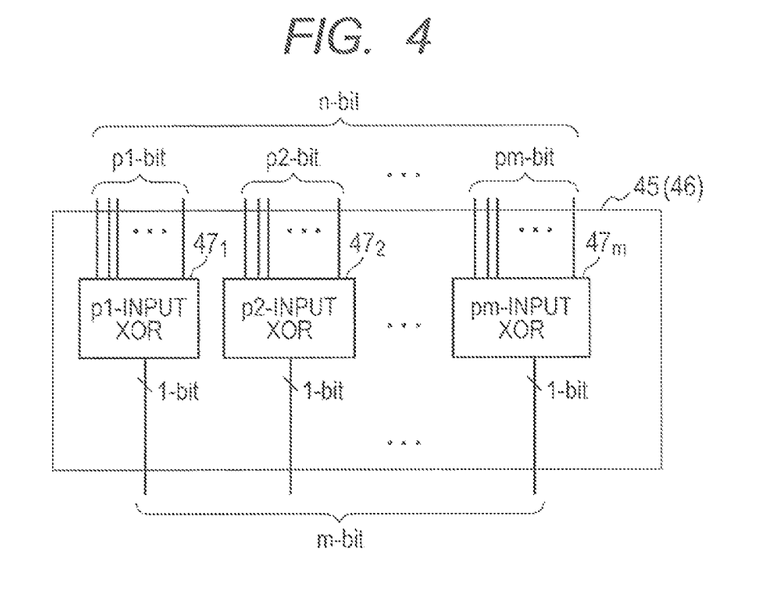
FIG. 4 is a diagram showing an example of the configuration of an n-bit-to-m-bit output compression circuit according to a second embodiment.

FIG. 4 is a diagram showing an example of the configuration of an n-bit-to-m-bit output compression circuit 45 (or 46) according to a second embodiment. In the second embodiment, the n-bit-to-m-bit output compression circuit 45 (or 46) is configured in such a way that a signal of n-bit is broken down into some groups, and a compression level of each group is set to be variable. In other words, the signal of n-bit width is broken down into m groups (a first group of p1-bit with, a second group of p2-bit with to a mth group of pm-bit width). The relation among p1, p2 to pm, m, and n in FIG. 4 is given by Equation (1).

$$n = \sum_{i=1}^{m} p_i \qquad (1)$$

A p1-Input XOR (exclusive OR) gate $47_1$ to a pm-Input XOR gate $47_m$ are hash functions that respectively maps a signal of p1-bit width to a signal of pm-bit width to hash values of 1-bit width (1 or 0). For example, the first group of p1-bit width is input into the p1-Input XOR gate $47_1$. The p1-Input XOR gate $47_1$ outputs an XOR logical sum (1-bit) of respective bit values of the signal of p1-bit width. The output of the p1-Input XOR gate $47_1$ is "0" if the number of the bits whose values are "1" out of the p1 bits (wherein p1 is the number of bits) is even, and "1" if the number of the bits whose values are "1" is odd (the compression ratio is p1:1).

The second group of p2-bit width is input into the p2-Input XOR gate $47_2$. The p2-Input XOR gate $47_2$ outputs an XOR logical sum (1-bit) of respective bit values of the signal of p2-bit width. The output of the p2-Input XOR gate $47_2$ is "0" if the number of the bits whose values are "1" out of the p2 bits (wherein p2 is the number of bits) is even, and "1" if the number of the bits whose values are "1" is odd (the compression ratio is p2:1).

The mth group of pm-bit width is input into the pm-Input XOR gate $47_m$. The pm-Input XOR gate $47_m$ outputs an XOR logical sum (1-bit) of respective bit values of the signal of pm-bit width. The output of the pm-Input XOR gate $47_m$ is "0" if the number of the bits whose values are "1" out of the pm bits (wherein pm is the number of bits) is even, and "1" if the number of the bits whose values are "1" is odd (the compression ratio is pm:1). Each of these p1-Input XOR gate $47_1$ to pm-Input XOR gate $47_m$ outputs a signal of 1-bit width in parallel. In other words, the n-bit-to-m-bit output compression circuit 45 (or 46) outputs a signal of m-bit width.

Each of the above p1-Input XOR gate $47_1$ to pm-Input XOR gate $47_m$ corresponds to a parity generation circuit of a parity check scheme. The parity generation circuit (even parity generation circuit) generates a parity bit "0" if the number of the bits of an input signal whose values are "1" is even, and a parity bit "1" if the number of the bits of an input signal whose values are "1" is odd.

As an example of a compression logic, in the case where there is an output signal of 2000-bit width (n=2000), if the output signal of 2000-bit width is broken down into 20 groups of 100-bit width (m=20, p1=p2=–pm=100 in FIG. 4), and if 1 bit is output as the result of an XOR logical operation with an input of 100-bit width for each group, m=20. Therefore, in a comparison circuit 40, the number of the flip-flops of which a two stage flip-flop (41, 42) is comprised can be reduced from 4000 (=2×2000) to 40 (=2×20).

In the second embodiment, the method to break down a signal of n-bit width into some groups is not limited to the above described method. In addition, although an XOR gate (a parity generation circuit) is used as a hash function circuit that generates a signal of 1-bit width from an input signal of plural-bit width in FIG. 4, it is needless to say that a hash function is not limited to an XOR gate.

It is conceivable that the compression levels for some signals out of signals output from a first and second processors 10, 20 are changed in accordance with their importance or the like in consideration of the effect of bit width compression on the accuracy of fault detection, the reliability, or the like.

Third Embodiment

Figure 5:
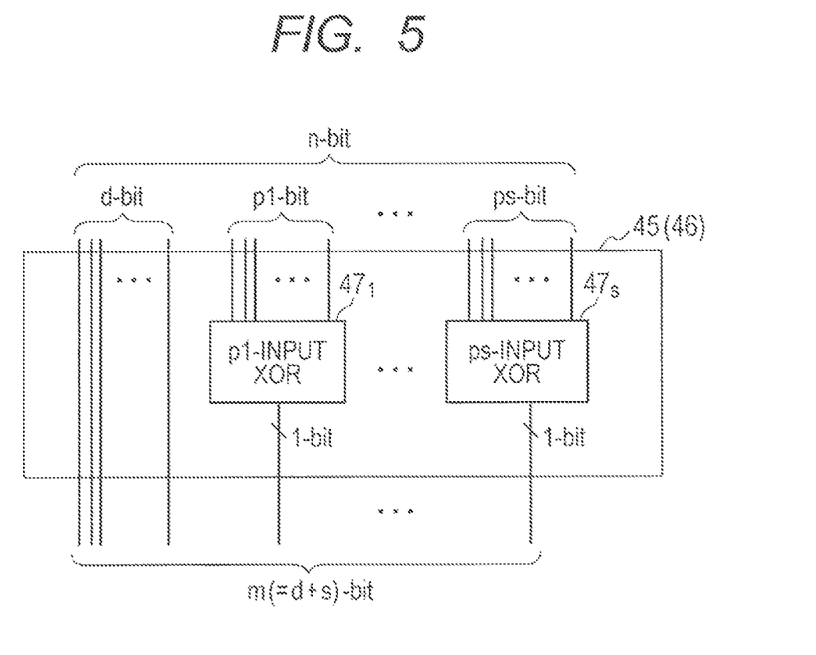
FIG. 5 is a diagram showing an example of the configuration of an n-bit-to-m-bit output compression circuit according to a third embodiment.

FIG. 5 is a diagram showing an example of the configuration of an n-bit-to-m-bit output compression circuit 45 (or 46) according to a third embodiment. Here, it will be assumed that the entire configuration of a semiconductor device according to the third embodiment is shown in FIG. 2. Hereinafter, an n-bit-to-m-bit output compression circuit 45 (or 46) will be described.

With reference to FIG. 5, in the n-bit-to-m-bit output compression circuit 45 (or 46) according to the third embodiment, a signal of n-bit width is broken down into some groups of signals, and the compression levels for the groups are set to be variable. However, for example, an important signal (of d-bit width) such as an address signal, a data signal, or a control signal (for example, a bus request, or a bus response) is not compressed. Other signals are broken into s groups (wherein s is the number of the groups), that is, a group of p1-bit width, a group of p2-bit width to a group of ps-bit width (a first group to a sth group), and each of a p1-Input XOR gate $47_1$ to a ps-Input XORgate $47_s$ output a signal of 1-bit width. The relations among p1, p2 to ps, n, m, s, and d in FIG. 5 are given by Equations (2) and (3).

$$n = d + \sum_{i=1}^{s} p_i \quad (2)$$

$$m = d + s \quad (3)$$

In the case where the configuration of the n-bit-to-m-bit output compression circuit 45 (or 46) is the configuration shown in FIG. 5, a signal of m (=d+s)-bit width output from the n-bit-to-m-bit output compression circuit 46, and a signal of m (=d+s)-bit width, which is a signal obtained by delaying a signal of m (=d+s)-bit width output from the n-bit-to-m-bit output compression circuit 45 by a two-stage flip-flop (41, 42), are input into a coincidence comparison circuit 43, and these two signals of m-bit width are bit wise compared. In this case, in each of the n-bit-to-m-bit output compression circuits 45, 46, an important signal (of d-bit width) such as an address signal, a data signal, or a control signal (for example, a bus request, or a bus response) is not compressed, and the important signals output through both first and second processors 10, 20 are bit wise compared with each other to check whether the important signals are equal to each other or not.

According to the third embodiment, the important signal for securing the reliability, detecting a fault, or the like out of the signals generated by breaking down a signal of n-bit width output from the processor 10 (or 20) is not compressed, and is bit wise compared as it is, which makes it possible to avoid the decrease of the accuracy of fault detection. In addition, because the total bit number of the signals generated by breaking down the signal of n-bit width is reduced from n bits to m bits, in the same way as the first embodiment, the number of flip-flops included in the delay circuit can be reduced from 2×n to 2×m, and the number of bits to be compared in the coincidence comparison circuit 43 can also be reduced to m, which makes it possible to suppress the increases in the circuit size and power consumption.

Figure 6:
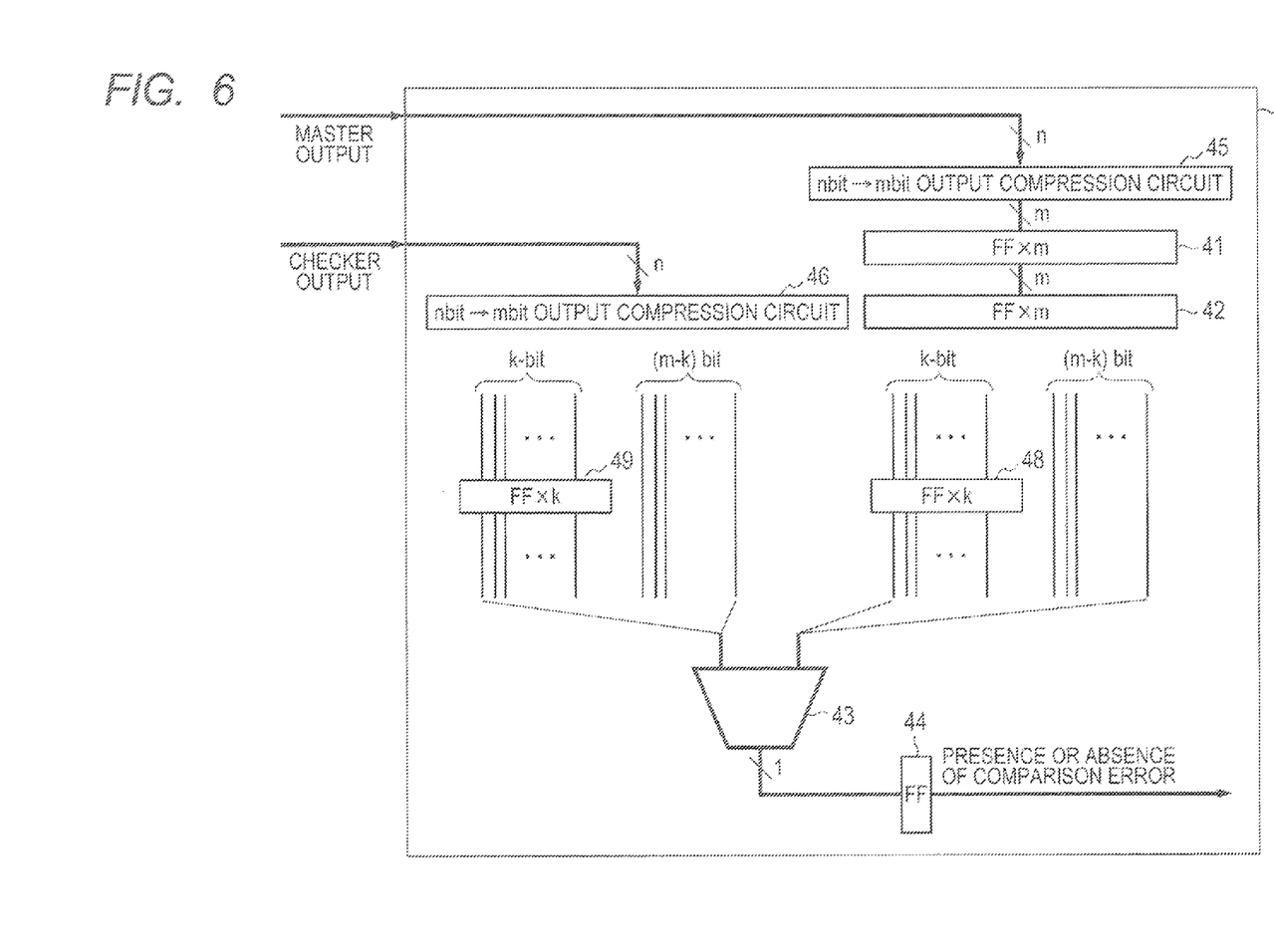
FIG. 6 is a diagram showing an example of the configuration of an output comparison circuit according to a fourth embodiment.

FIG. 6 is a diagram showing an example of the configuration of an output comparison circuit 40 according to a fourth embodiment. It will be assumed that a first and second processors 10 and 20 and an input control circuit 30 of the fourth embodiment are those shown in FIG. 2. There is a case where, for example, the signal output from the second processor 20 becomes critical in terms of timing in the coincidence comparison circuit 43. Therefore, in the fourth embodiment as shown in FIG. 6, a output comparison circuit 40 is configured so that a signal of k-bit width involved in a critical path in a coincidence comparison circuit 43 is sampled in advance by a flip-flop 49 after the signal is output from a n-bit-to-m-bit output compression circuit 46, and then the sampled signal as compared in the coincidence comparison circuit 43.

With reference to FIG. 6, a signal of m-bit width, the bits of which are output in parallel from an n-bit-to-m-bit output compression circuit 46, is broken down into a signal of k-bit width (where 1≤k<m) and a signal of (m−k)-bit width, and the signal of k-bit width is sampled in advance by the flip-flop (FF×k) 49, which includes k constituent flip-flops coupled in parallel (wherein k is the number of the constituent flip-flops), and the sampled signal of k-bit width is input into the coincidence comparison circuit 43, while the remaining signal of (m−k)-bit width is directly input into the coincidence comparison circuit 43. A signal of k-bit width obtained by breaking down a signal of m-bit width output from a two-stage flip-flop (41, 42) that delays a signal of m-bit width output from a n-bit-to-m-bit output compression circuit 45 is sampled in advance by a flip-flop 48 that is comprised or k constituent flip-flops coupled in parallel, (this signal of k-bit width corresponds to the signal of k-bit width obtained by breaking down the signal of m-bit width output from the n-bit-to-m-bit output compression circuit 46), and the sampled signal of k-bit width is input into the coincidence comparison circuit 43. On the other hand, the remaining signal of (m−k)-bit width is directly input into the coincidence comparison circuit 43. Each of the flip-flops 48 and 49 includes, for example, plural edge-trigger type D-flip-flops each of which samples a signal input into its data terminal at the rising edge or at the falling edge of a clock signal. The flip-flops 48 and 49 are respectively sampling circuits for re-timing.

There is only a little timing margin in the relation among the delay needed for the n-bit-to-m-bit output compression to perform compression processing, the delay needed for the coincidence comparison to perform comparison processing, etc. and a clock cycle (a clock frequency). In other words, the output signal (of k-bit width) whose delay is critical is input into the coincidence comparison circuit 43 after being sampled by the flip-flop 49.

The signal of k-bit width obtained by breaking down the signal of m-bit width output from a two-stage flip-flop (41, 42), which delays a signal of m-bit width output from a n-bit-to-m-bit output compression circuit 45 that compresses an output signal of n-bit (Master output) from the first processor 10 into a signal of m-bit width, corresponds to the output signal of k-bit that is output from the n-bit-to-m-bit output compression circuit 46 (and sampled by the flip-flop 49 afterward), and this signal of k-bit width is input into the coincidence comparison circuit 43 via the flip-flop 48.

Even in the case where, because the signal output from the second processor, for example, at a predefined timing in the latter part of a clock cycle is delayed by the compression processing of the n-bit-to-m-bit output compression circuit 46, the comparison processing in which the above output signal (of k-bit width) is dealt with, performed by the coincidence comparison circuit 43 is not finished, for example, in the above clock cycle, outputs sampled by the flip-flops 48 and 49 (the flip-flops 48 and 49 hold values sampled at the edge of a clock cycle until the edge of the next clock cycle, that is, during the time period of one clock cycle) can be used for the comparison, which enables the comparison operation to be stabilized and the error detection to be avoided. In addition, because critical paths owing to the coincidence comparison circuit (43) and the like are resolved, the lowering of the clock frequency for securing a timing margin and the like can be avoided and the high-speed operation of the semiconductor device can be realized (with the use of a high clock frequency).

Fifth Embodiment

Figure 7:
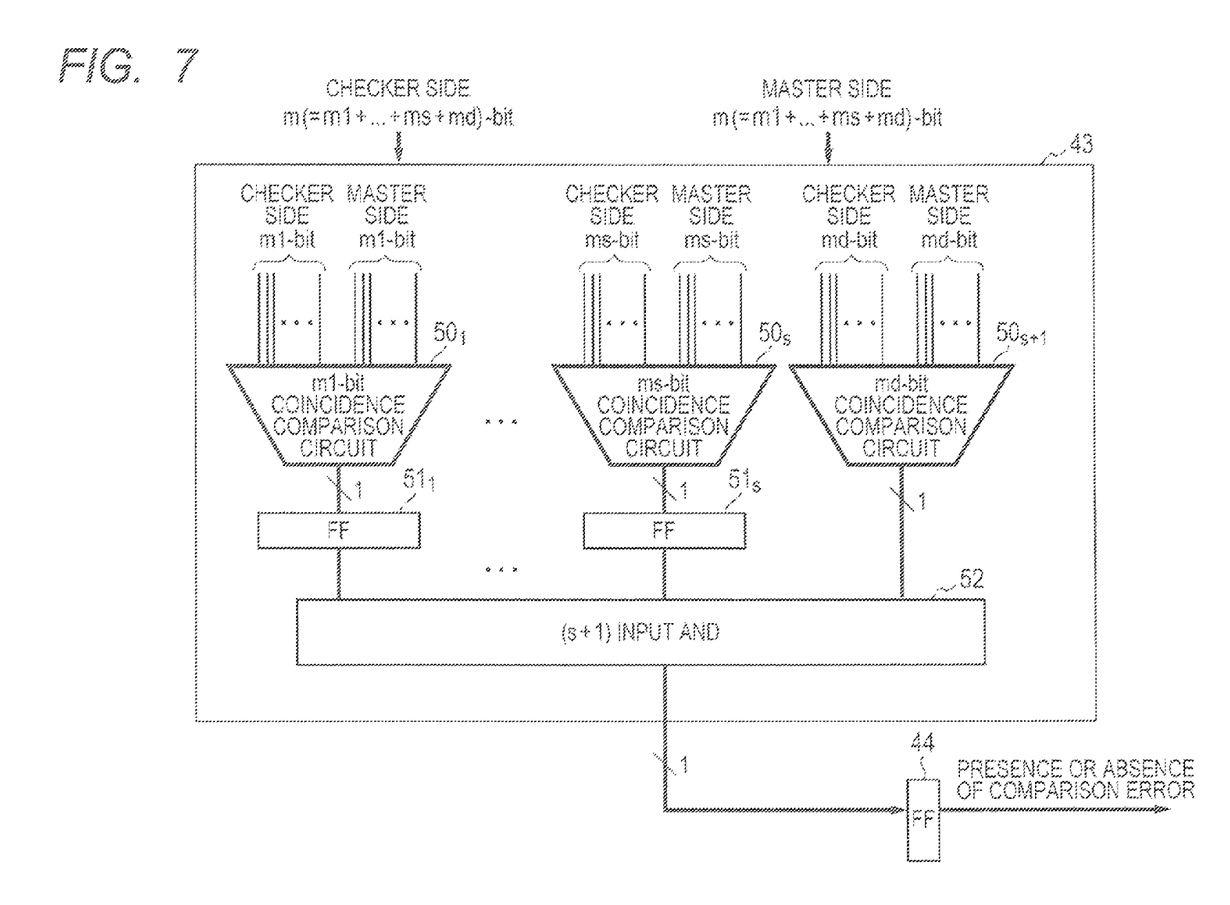
FIG. 7 is a diagram showing an example of the configuration of a coincidence comparison circuit according to a fifth embodiment.

It will be assumed that the entire configuration of a semiconductor device according to the fifth embodiment is shown in FIG. 2. Hereinafter, an n-bit-to-m-bit output compression circuit 45 (or 46) will be described. FIG. 7 is a diagram showing the configuration of a coincidence comparison circuit 43 according to a fifth embodiment. In the fifth embodiment, out of signals obtained by breaking down signals of m-bit width originating from processors 10 and 20, some signals that are critical in terms of timing are grouped with a few number of signals. Subsequently, each signal relevant to the processor 10 out of the some signals are compared with its counterpart relevant to the processor 20 to check whether they coincide with each other or not, and each comparison result (of 1-bit width) is sampled by the corresponding flip-flop of flip-flops 51₁ to 51ₛ (refer to FIG. 7).

The signal of m-bit width output from a two-stage flip-flop (41, 42) for delaying the output of an n-bit-to-m-bit output compression circuit 45, which compresses the output of n-bit width of the first processor 10 shown in FIG. 2 (master output) into a signal of m-bit width, is broken down into (s+1) groups (wherein (s+1) represents the number of the groups) as shown in FIG. 7. In a similar way, the signal of m-bit width output from an n-bit-to-m-bit output compression circuit 46, which compresses the output of n-bit width of the second processor 20 (checker output) into a signal of m-bit width, is broken down into (s+1) groups. The signal of a first group to the signal of an sth group are respectively a signal of $m_1$-bit width to a signal of $m_s$-bit width, and the signal of an (s+1)th group is a signal of md-bit width. The relation among $m_1$ to $m_d$, d, and m is given by Equations (4).

$$m = \sum_{i=1}^{s} m_i + m_d \quad (4)$$

The signals of $m_1$-bit width of the first group output from both processors are bit wise compared with each other by an $m_1$-bit coincidence comparison circuit 50₁.

The signals of $m_s$-bit width of the sth group output from both processors are bit wise compared with each other by an $m_s$-bit coincidence comparison circuit 50ₛ.

The signals of $m_d$-bit width of the (s+1)th group output from both processors are bit wise compared with each other by an $m_d$-bit coincidence comparison circuit 50ₛ₊₁.

The output signals of 1-bit width output from the $m_1$-bit coincidence comparison circuit 50₁ to the $m_n$-bit coincidence comparison circuit 50ₛ are respectively sampled by the flip-flops 51₁ to 51ₛ, and the sampled signals are respectively input into the first to sth input terminals of an (s+1)-Input AND circuit 52. The flip-flops 51₁ to 51ₛ respectively comprise, for example, edge-trigger type D-flip-flops. The flip-flops 51₁ to 51ₛ are respectively sampling circuits for re-timing.

The output signal of 1-bit width output from the $m_d$-bit coincidence comparison circuit 50ₛ₊₁ is input into the (s+1)th input terminal of the (s+1)-Input AND circuit 52. If all the outputs of 1-bit width of the $m_1$-bit coincidence comparison circuit 50₁ to $m_d$-bit coincidence comparison circuit 50ₛ₊₁ are High, the output of the (s+1)-Input AND circuit 52 becomes High, and if at least one of the outputs of 1-bit width of the $m_1$-bit coincidence comparison circuit 50₁ to $m_d$-bit coincidence comparison circuit 50ₛ₊₁ is Low, the output of the (s+1)-Input AND circuit 52 becomes Low.

According to the fifth embodiment, the coincidence comparison circuit 43 comprises plural coincidence comparison circuits 50₁ to 50ₛ₊₁, and the circuit size and delay of the plural coincidence comparison circuits 50₁ to 50ₛ₊₁ are far smaller than those of a coincidence comparison circuit 43 that compares two signals of m-bit width with each other.

In addition, according to the fifth embodiment, because the signals that are critical in terms of timing are sampled by the flip-flops 51₁ to 51ₛ, and the sampled signals are input into the (s+1)-Input AND circuit 52, the lowering of the clock frequency and the like can be avoided and the high-speed operation of the semiconductor device can be realized (with the use of a high clock frequency). In addition, according to the fifth embodiment, in the same way as the first to fourth embodiments, because the output signal of n-bit width output from the first processor is compressed into a signal of m-bit width, and then the compressed signal is input into a two-stage flip-flop (41, 42) and delayed, the number of flip-flops, of which the two-stage flip-flop (41, 42) is comprised, can be reduced, and by just that much, the circuit area and power consumption can be reduced.

Sixth Embodiment

Figure 8:
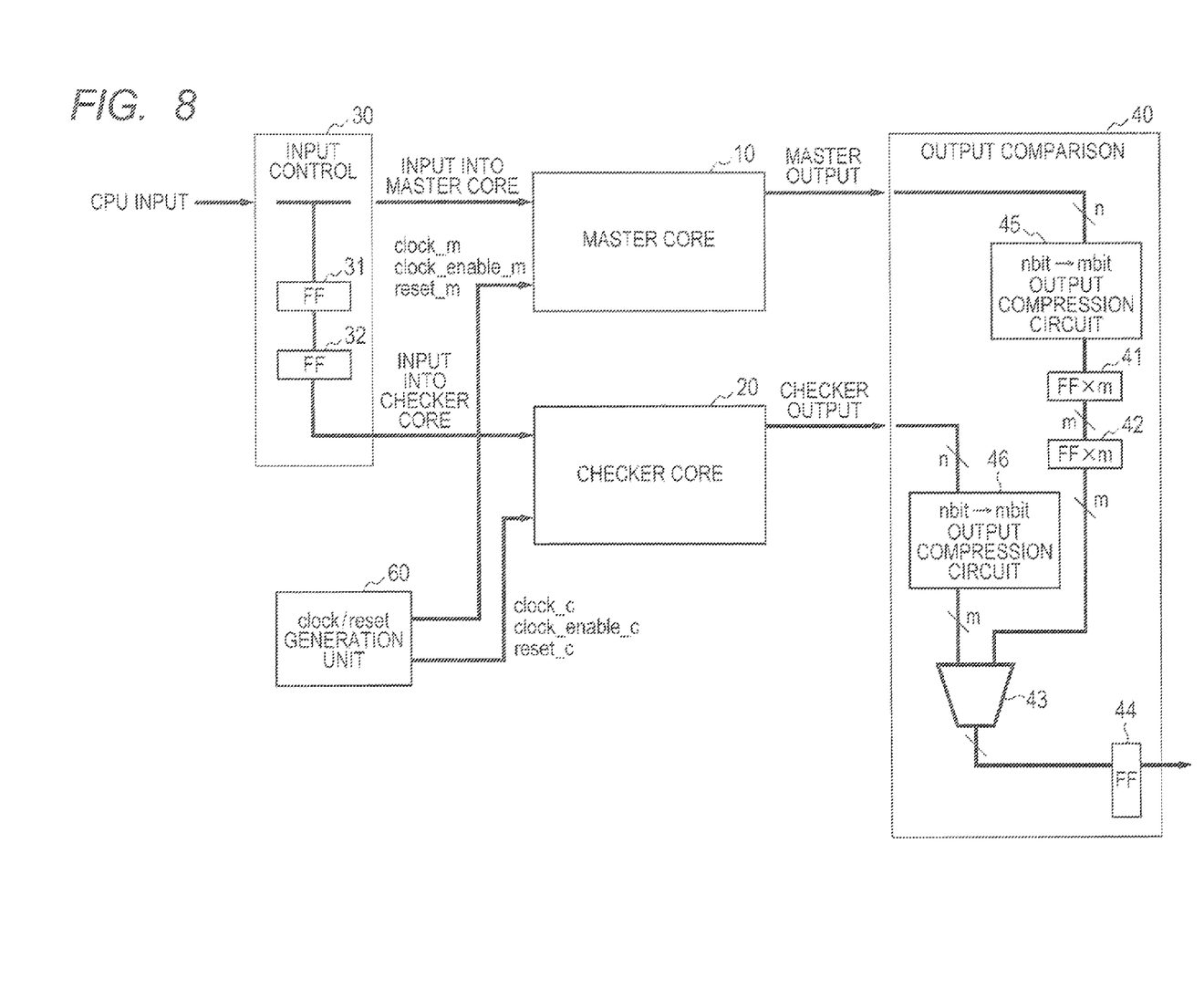
FIG. 8 is a diagram showing an example of the configuration of a semiconductor device according to a sixth embodiment.

FIG. 8 is a diagram showing the configuration of a semiconductor device according to a sixth embodiment. A difference point between the configuration shown in FIG. 8 and that shown in FIG. 2 is the fact that the configuration of the semiconductor device according to the sixth embodiment includes a clock/reset generation unit 60, and a clock signal, a clock_enable signal, and a reset signal for the first processor and a clock signal, a clock_enable signal and a reset signal for the second processor are not used in common respectively, that is, the clock signal, the clock_enable signal, and the reset signal for the first processor are respectively independent of the clock signal, the clock_enable signal, and the reset signal for the second processor. The clock/reset generation unit 60 feeds a clock_m, a clock_enable_m, and a reset_m to the first processor (Master core), and feeds a clock_c, a clock_enable_c, and a reset_c to the first processor (Checker core).

For example, in the case where the semiconductor device according to the sixth embodiment operates in a lockstep mode, the clock/reset generation unit 60 feeds a clock signal as a common signal to the clock_m and clock_c. In the same way, the clock/reset generation unit 60 feeds a clock_enable signal as a common signal to the clock_enable_m and clock_enable_c, and feeds a reset signal as a common signal to the reset_m and reset_c.

When it is not necessary for the second processor 20 to operate such as in the case where the semiconductor device does not operate in the lockstep mode and the like, the clock/reset generation unit 60 stops feeding the clock signal clock_c to the second processor 20 to stop the operation of the second processor 20, and feeds the clock signal clock_m only to the second processor 20 to make the first processor 10 operate. When the semiconductor device does not operate in the lockstep mode, an input control circuit 30 feeds a CPU input as it is to the first processor (Master core) 10, and a two-stage flip-flop (31, 32) does not operate. Therefore, the power consumption can be reduced.

When the semiconductor device operates in the lockstep mode in the sixth embodiment, in the same way as the above described embodiments, the output signal of n-bit width output from the first processor is compressed into a signal of m-bit width, and then the compressed signal is input into a two-stage flip-flop (41, 42) and delayed. Therefore, the number of flip-flops, of which the two-stage flip-flop (41, 42) is comprised, can be reduced, and by just that much, the circuit area and power consumption can be reduced. In addition, it is also conceivable that the semiconductor device is configured with a combination of the sixth embodiment and the above described second to fifth embodiments.

Seventh Embodiment

FIG. 9 is a diagram showing the configuration of an n-bit-to-m-bit output compression circuit 45 (or 46) according to a seventh embodiment. It will be assumed that the entire configuration of a semiconductor device including the seventh embodiment is shown by FIG. 2, and the configuration of the n-bit-to-m-bit output compression circuit 45 (or 46) according to the seventh embodiment is different from the configuration of the n-bit-to-m-bit output compression circuit 45 (or 46) according to the second embodiment or the like. In the second embodiment, the n-bit-to-m-bit output compression circuit 45 (or 46) shown in FIG. 4 breaks down a signal of n-bit into plural groups, and hash function circuits for individual groups are parity generation circuits of a parity check scheme (p1-Input XOR gate 47$_1$ to pm-Input XOR gate 47$_m$). On the other hand, in the seventh embodiment, as shown in FIG. 9, the n-bit-to-m-bit output compression circuit 45 (or 46) comprises double error detection coding circuits 47A$_1$ to 47A$_d$ (hash function circuits) that respectively bring in a signal of y1-bit width to a signal of yd-bit width (wherein the bit widths y1 to yd are predefined), and respectively output a double error detection code of z1-bit width to a double error detection code of zd-bit width.

Each of the double error detection coding circuits 47A$_1$ to 47A$_d$ that output double error detection codes comprises, for example, an error correction code generation circuit.

As is commonly known, in ECC (Error Correction Coding or Error Checking and Correcting), a redundant code (ECC code) of multi-bit width (for example, 8-bit width) is generated for data of predefined number-bit width (for example, data of 64-bit width), the redundant code is appended to the data, the data is stored in a memory or the like, and when the data is read out from the memory, an ECC code is generated from the data. Subsequently, the generated ECC code is compared with the original ECC code, and if these codes do not coincide with each other, it is judged that a bit error has occurred in the read-in data, and single-bit error correction is performed. In ECC, as well as the single-bit error correction for correcting a single-bit error, multi-bit error detection such as 2-bit error detection is performed (although only detection is performed in the multi-bit detection). In ECC, for example, Hamming codes are used. In FIG. 9, it is all right that the coding circuits 47A1 to 47Ad (the error correction code generation circuits) for the individual groups respectively output redundant codes (ECC codes) as the signal of z1-bit width to the signal of zd-bit width obtained by compressing the incoming signals of y1-bit width to yd-bit width of the individual groups. In addition, although, as described above, the single-bit error correction and the multi-bit error detection are performed (although only detection is performed in the multi-bit detection) in ECC, it is not necessary for the error correction (single-bit error correction) to be performed in the seventh embodiment (The implementation of a single-bit error correction circuit is unnecessary).

In the example shown in FIG. 9, the n-bit-to-m-bit output compression circuit 45 (or 46) includes a p1-Input XOR gate 47$_1$ to ps-Input XOR gate 47$_s$ that respectively input a signal of p1-bit width to a signal of ps-bit width that respectively corresponds to s groups (wherein s represents the number of the groups), and that compresses the input signals into signals of 1-bit width respectively. Here, the relations among y1 to yd, p1 to ps, z1 to zd (wherein z1<y1, . . . , zd<yd), the bit width n of the pre-compression signal, the sum of the bit widths of the post-compression signals are given by Equations (5) and (6).

$$n = \sum_{i=1}^{d} y_i + \sum_{i=1}^{s} p_i \tag{5}$$

$$m = \sum_{i=1}^{d} z_i + s \tag{6}$$

In the seventh embodiment, a signal of n-bit width is broken down into plural groups, and in the compression processing of the bit widths of the individual groups, as well as the compressions of some bit widths in which single-bit errors can be detected, performed by the XOR gates, the compressions of the other bit widths, in which double error detection codes can be output by the coding circuits 47A$_1$ to the coding circuits 47A$_d$, are performed, and the sum of the bit widths of the post-compression signals are reduced from n to m (m<n). In addition, in the seventh embodiment, it is conceivable that there is only one coding circuit 47A$_1$ (d=1). On the other hand, the n-bit-to-m-bit output compression circuit 45 (or 46) can be configured in such a way that all the groups are respectively provided with coding circuits. (In this case, the p1-Input XOR gate to ps-Input XOR gate shown in FIG. 9 are deleted.)

Although the present invention devised by the inventors has been concretely described on the basis of the above embodiments, it is needless to say that the present invention is not limited to these embodiments, and various modifications may be made without departing from the gist of the present invention. In addition, the disclosures of Japanese Unexamined Patent Application Publications No. Hei 10(1998)-116258, No. 2011-113545, No. Hei5(1993)-324391, No. Hei1(1989)-265171, and No. 2011-128821 are incorporated herein by reference. Within the scope of all the disclosures of the present invention (including those of the appended claims) and on the basis of the fundamental technological ideas, the above embodiments and examples may be modified and adjusted. In addition, within the scope of the claims of the present invention, a variety of combinations and selections of various disclosed elements (including the elements disclosed in the appended claims, the elements disclosed in the examples, and the elements disclosed in the appended drawings) may be made. In other words, it goes without saying that the present invention includes various changes and modifications that may be made by those skilled in the art in accordance with all the disclosures including the disclosures of the claims and the technological ideas of the present invention.

What is claimed is:

1. A semiconductor device comprising:
a first processor;
a second processor;
a first delay circuit that brings in a signal that is input into the first processor, delays the brought-in signal by the time period of a predefined number of cycles, and inputs the delayed signal info the second processor;
a first compression circuit that brings in a signal of n-bit width output from the first processor and compresses the signal of n-bit width into a signal of m-bit width (wherein m<n);
a second compression circuit that brings in a signal of n-bit width output from the second processor and compresses the signal of n-bit width into a signal of m-bit width;
a second delay circuit that brings in the signal of m-bit width output from the first compressor, delays the signal of m-bit width by the time period of the predefined number of cycles used by the first delay circuit, and outputs the delayed signal; and
a coincidence comparison circuit that brings in the signal of m-bit width output from the second delay circuit and the signal of m-bit width output from the second compression circuit, and compares bit-wise the corresponding bits of the two brought-in signals with each other to check whether the corresponding bits of the two brought-in signals coincide with each other or not.

2. The semiconductor device according to claim 1, wherein each of the first and second compression circuits includes a hash function circuit that compresses the signal of n-bit width into the signal of m-bit width.

3. The semiconductor device according to claim 1, wherein each of the first and second compression circuit breaks down the signal of n-bit width into a plurality of groups; and
includes at least one hash function circuit that compresses a signal of at least one group out of signals of the plurality of groups into a signal of 1-bit width, and outputs the compressed signal of 1-bit width,
wherein the sum of the number of the bit width of the at least one output signal output from the hash function circuit and the numbers of the bit widths of signals of the remaining groups is m.

4. The semiconductor device according to claim 1, wherein each of the first and second compression circuit breaks down the signal of n-bit width into m groups (wherein m represents the number of the groups); and
includes m hash function circuits (wherein m represents the number of the hash function circuits) that respectively compress the signals of m groups into signals of 1-bit width and output the compressed signals of 1-bit width.

5. The semiconductor device according to claim 4, wherein the m hash function circuits include at least two hash function circuits whose compression ratios are different from each other.

6. The semiconductor device according to claim 1,
wherein each of the first and second compression circuit breaks down the signal of n-bit width into (s+1) groups (wherein (s+1) represents the number of the groups);
outputs a signal of d-bit width of one group without changing the d-bit width (d+s=m); and
includes s hash function circuits (wherein s represents the number of the hash function circuits) that compress the bit widths of signals of s groups into 1-bit widths respectively.

7. The semiconductor device according to claim 1, further comprising:
a first sampling circuit that samples a signal of predetermined k-bit width out of the signal of m-bit width output from the second compression circuit; and
a second sampling circuit that samples a signal of k-bit width, which corresponds to the bit width of the signal the first sampling circuit samples, out of the signal of m-bit width output from the second delay circuit,
wherein a signal of k-bit width sampled by the first sampling circuit and a remaining signal of (m−k)-bit width out of the signal of m-bit width output from the second compression circuit, and a signal of k-bit width sampled by the second sampling circuit and a remaining signal of (m−k)-bit width out of the signal of m-bit width output from the second delay circuit are respectively input into the coincidence comparison circuit.

8. The semiconductor device according to claim 7,
wherein each of the first and second sampling circuits includes k flip-flops (wherein k represents the number of the flip-flops) that are coupled in parallel, bring in and sample the signal of k-bit width in response to the trigger edge of a clock signal, and output the sampled signal.

9. The semiconductor device according to claim 1,
wherein the coincidence comparison circuit:
breaks down the signal of m-bit width output from the second delay circuit into (s+1) groups (wherein (s+1) represents the number of the groups);
breaks down the signal of m-bit width output from the second compression circuit into (s+1) groups;
includes a first to a (s+1)th coincidence comparison circuits,
wherein the first coincidence comparison circuit compares a signal of the first group output from the second delay circuit and a signal of the first group output from the second compression circuit with each other and outputs a comparison result of a 1-bit width, and the (s+1)th coincidence comparison circuit compares a signal of the (s+1)th group output from the second delay circuit and a signal of the (s+1)-th group output from the second compression circuit with each other and outputs a comparison result of a 1-bit width; and
further includes a logic circuit that brings in respective 1-bit outputs of the first to the (s+1)th coincidence comparison circuits, and outputs the logic operation result of the brought-in signal of (s+1)-bit width as a comparison result obtained by comparing the signal of m-bit width output from the second delay circuit and the signal of m-bit width output from the second compression circuit.

10. The semiconductor device according to claim 9, comprising at least one third sampling circuit that brings in and samples at least one predetermined output out of the outputs of the first to the (s+1)th coincidence comparison circuits, and inputs the sampled at least one predetermined output into the logic circuit.

11. The semiconductor device according to claim 10, wherein the third sampling circuits are configured to include flip-flops that sample inputs in response to the trigger edge of a clock signal and output the sampled inputs.

12. The semiconductor device according to claim 1, further comprising a circuit that exercises control over supplying a clock signal to both first and second processors in common or stopping supplying the clock signal to one of the first and second processors.

13. The semiconductor device according to claim 1, wherein the first delay circuit includes flip-flops that are arranged in a predetermined number of cascade-coupled stages, each of the stages has parallel-disposed flip-flops the number of which corresponds to the bit number of the input signal, end the parallel-disposed flip-flops sample the input signal in response to the edge trigger of a clock signal and outputs the sampled signal.

14. The semiconductor device according to claim 1, wherein the second delay circuit includes flip-flops that are arranged in a predetermined number of cascade-coupled stages, each of the stages has m parallel-disposed flip-flops (wherein m represents the number of the parallel-disposed flip-flops), and the parallel-disposed flip-flops sample the input signal in response to the edge trigger of a clock signal and outputs the sampled signal.

15. The semiconductor device according to claim 1, wherein each of the first and second compression circuits breaks down the signal of n-bit width into a plurality of groups; and further comprises, as a hash function circuit corresponding to a signal of at least one group out of the signals of the plurality of groups, a coding circuit that forms a multi-bit error detectable code regarding the input signal of the at least one group, and outputs a signal obtained by compressing the bit width of the input signal of the at least one group.

* * * * *